United States Patent [19]

Todd

[11] Patent Number: 4,747,226
[45] Date of Patent: May 31, 1988

[54] ICE FISHING ACCESSORY

[76] Inventor: Harry V. Todd, 2429 Windmill View, El Cajon, Calif. 92020

[21] Appl. No.: 83,173

[22] Filed: Aug. 10, 1987

[51] Int. Cl.⁴ .............................................. A01K 97/01
[52] U.S. Cl. ......................................................... 43/4
[58] Field of Search ............................. 43/4, 15, 16, 17

[56] References Cited

U.S. PATENT DOCUMENTS

| | | | |
|---|---|---|---|
| 2,838,196 | 6/1958 | Chapman | 43/4 |
| 2,914,926 | 12/1959 | Meagher | 43/4 |
| 3,056,272 | 10/1962 | Eilers | 43/4 |
| 3,059,451 | 10/1962 | Anderson | 43/4 |
| 3,555,827 | 1/1971 | Herr | 43/4 |
| 3,999,322 | 12/1976 | Kooker | 43/4 |

Primary Examiner—M. Jordan
Attorney, Agent, or Firm—Bernard L. Kleinke

[57] ABSTRACT

A fishing assembly adapted to prevent an ice hole from freezing over. The fishing assembly includes a plastic tubular hollow elongated sleeve for fitting inside the ice hole and a flat annular flange which extends integrally radially outwardly from the sleeve, for retaining the fishing assembly in position inside the ice hole. A plastic cover is secured removably to the upper end of the sleeve for sealing it. The cover includes a slit-like slot for defining an entranceway for the fishing line to extend therethrough into the ice hole. A flag assembly is secured moveably to the cover, for providing a visual indication to the user that a fish has struck the bait. An internal ridge supports the cover entirely within the hollow interior of the sleeve at a substantial distance from the upper edge thereof, thereby to prevent inadvertent dislodgment thereof. The cover is therefor disposed closer to the water surface for providing a better insulation thereto.

20 Claims, 2 Drawing Sheets

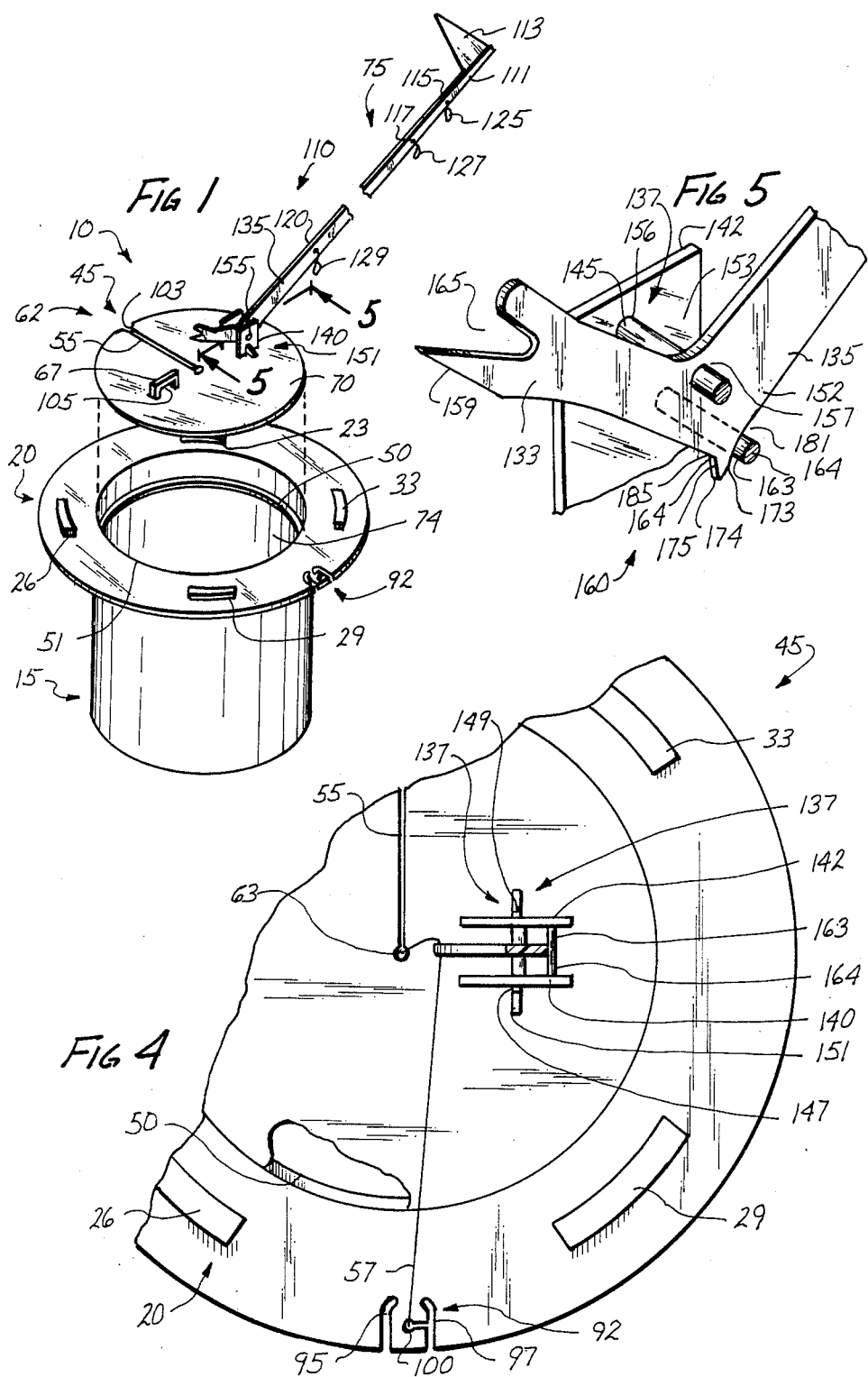

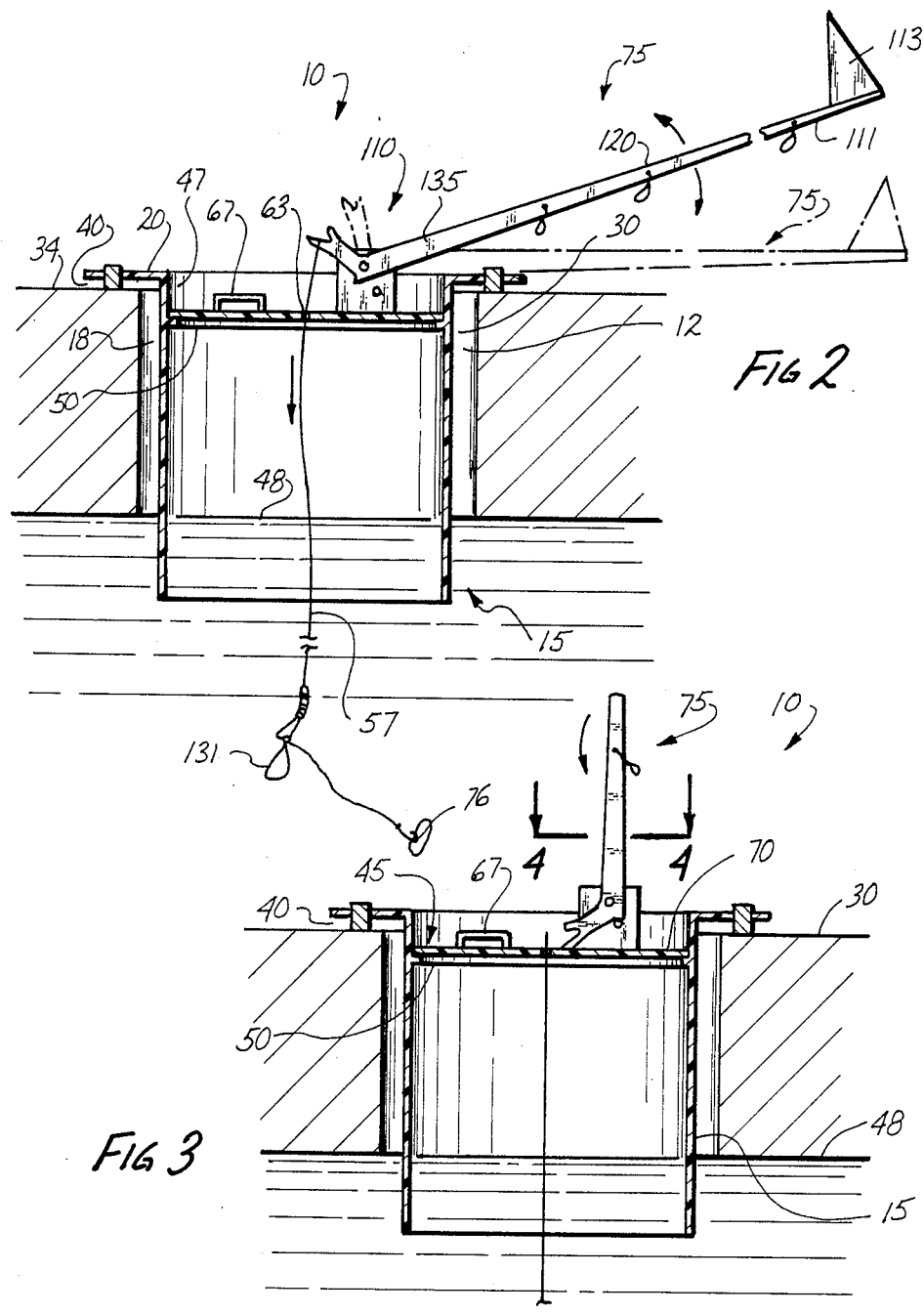

ICE FISHING ACCESSORY

TECHNICAL FIELD

The present invention relates in general to sporting equipment, and it more particularly relates to fishing accessories for tending to prevent ice fishing holes from freezing over.

BACKGROUND ART

Ice fishing of the general type with which the present invention is concerned, has long been practiced as a winter sport, and it is done through a generally cylindrical hole in the surface of a frozen lake, stream, or the like. A fishing line is lowered into the water through the hole, and a variety of fishing equipment, including poles and devices for supporting the poles, have long been employed to retain the line. However, due to the extreme cold weather in which such fishing is carried on, a brisk wind blowing across the opened hole in the ice can cause the hole to freeze over before the fishing activity is completed. Furthermore, the wind can often blow snow and chips of ice and the like, across the opened hole, which can obscure and plug the hole.

In an attempt to overcome these problems, covers have been used to close over the ice hole to help insulate the ice hole from the cold ambient temperatures. However, the wind can cause the hole to become exposed to freezing temperatures, by dislodging the cover which seals the hole.

There have been several other attempts to prevent the ice-bound hole from becoming frozen over, to re-open the frozen hole, and to fix the cover securely to the hole to avoid the dislodgement thereof. Such conventional attempted techniques are best illustrated in the following U.S. Pat. Nos.: 2,799,146; 2,838,196; 2,877,595; 2,914,926; 3,056,272; 3,059,451; 3,813,891; 3,464,137; 3,466,781; 3,555,827; 3,999,322; 4,218,840; 4,438,757.

The foregoing conventional devices have proven to be less than totally satisfactory. One such device is described in the U.S. Pat. No. 4,438,757, as including a double walled tubular member heated by a circulating fluid, for causing the dislodgement of a block of ice from the frozen surface.

Other conventional devices have been designed to prevent ice fishing holes from freezing when not in use, and to secure a cover over the holes. For example, as described in the U.S. Pat. No. 3,555,827, a plug has a relatively complex pressurized shell, and a cover is secured to the shell by hold-down brackets to prevent it from being dislodged by the wind. However, when the plug is installed inside the hole, the hole can no longer be used for fishing.

Therefore, it would be highly desirable to have a new and improved ice fishing assembly which effectively prevents, or at least retards, the ice fishing hole from freezing over, and which is relatively simple and inexpensive to produce, use, assemble, install, and disassemble. The fishing assembly should be light in weight and sufficiently compact to facilitate transportation and storage. It should prevent the ice fishing hole from freezing over, whether the hole is in use, or not in use. Moreover, the fishing assembly should not prevent the user from fishing when the assembly is installed in the fishing hole.

Furthermore, the fishing assembly should not be accidentally uncovered readily, nor dislodged from the hole by the wind. It should give a visual indication whenever a fish strikes the bait, and it should accommodate various fishing techniques, such as fishing poles or drop lines. Additionally, it should fit ice holes of various sizes and irregular shapes.

DISCLOSURE OF INVENTION

Therefore, an object of the present invention is to provide a new and improved fishing assembly which effectively prevents the ice fishing hole from freezing over, whether the hole is in use, or not in use.

Another object of the present invention is to provide such a new and improved fishing assembly, which is relatively simple and inexpensive to produce, use, assemble, install, and disassemble.

A further object of the present invention is to provide such a new and improved fishing assembly, which provides a ready visual indication whenever a fish strikes the bait.

Briefly, the above and further objects and features of the present invention are provided by a fishing assembly adapted to prevent an ice hole from freezing over. The fishing assembly includes a plastic tubular hollow elongated sleeve for fitting inside the ice hole and a flat annular flange which extends integrally radially outwardly from the sleeve, for retaining the fishing assembly in position inside the ice hole.

A plastic cover is secured removably to the upper end of the sleeve for sealing it. The cover includes a slit-like slot for defining an entranceway for the fishing line to extend therethrough into the ice hole. A flag assembly is secured moveably to the cover, for providing a visual indication to the user that the fish has struck the bait. An internal ridge supports the cover entirely within the hollow interior of the sleeve at a substantial distance from the upper edge thereof, thereby to prevent inadvertent dislodgement thereof. The cover is therefore disposed closer to the water surface for providing a better insulation thereto.

Therefore, the fishing assembly prevents the ice hole from freezing by insulating it from the cold ambient temperatures. Furthermore, it is not only light in weight, but is also compact in size, and is adapted to fit universally inside a wide range of holes having different sizes and irregular shapes. Hence, the use of a single assembly facilitates the transportation and storage of the fishing equipment, and renders the fishing expedition more enjoyable by offering the user a wider selection of fishing options, and by extending the fishing activities without undue interruptions.

The particular arrangement of the flat flange, enables the fishing assembly to sealed over, and to engage the various ice holes. The cover is retained securely inside the sleeve, and accidental dislodgment thereof is prevented due to its recessed positioning inside the sleeve. The entranceway in the cover enables the user to fish, even while the assembly is disposed within the ice hole.

The fishing assembly is mainly composed of plastic, and it is therefore produced readily and inexpensively by conventional injection molding techniques. Thus, a person can more easily afford financially to purchase several of the assemblies, since it is customary to form several ice holes to enable a multiple number of fishing lines to be used simultaneously. Furthermore, the fishing assembly can be used with either a drop line or a fishing pole.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 1 is an exploded pictorial view of a fishing assembly, which is constructed in accordance with the present invention;

FIG. 2 is an enlarged front elevational fragmentary sectional view of the fishing assembly of FIG. 1, shown engaged inside a fishing hole, and illustrating an intermediate movement of an indicator mechanism which is a part of the fishing assembly to provide an attention attracting signal to the user that a fish is nibbling at the bait;

FIG. 3 is an enlarged front elevational fragmentary sectional view of the fishing assembly of FIG. 1, showing the flag assembly in an upright position indicating that a fish has taken the bait;

FIG. 4 is a greatly enlarged fragmentary top plan sectional view of the fishing assembly of FIG. 3, taken substantially on line 4—4 thereof; and FIG. 5 is a greatly enlarged fragmentary pictorial view of the fishing assembly of FIG. 1, taken substantially on line 5—5 thereof.

BEST MODE FOR CARRYING OUT THE INVENTION

Referring now to the drawings, and more particularly to FIGS. 1 and 2 thereof, there is illustrated a fishing assembly 10, which is constructed in accordance with the present invention, and which is adapted for use as a fishing accessory for preventing an ice hole 12 from freezing over.

The assembly 10 generally includes an open-ended plastic tubular sleeve 15 for fitting inside the hole 12. The sleeve 15 extends radially outwardly into a flat annular rim or flange 20, for resting on and overlying the portion of the ice surrounding the hole 12 for supporting the sleeve 15 from the upper surface of the ice and thus for retaining the sleeve 15 in position within the hole 12. Thus, the fishing assembly 10 can be used universally for various ice holes having various different sizes, such as the usual 8, 9, 10 or 11-inch holes. Furthermore, the flat flange 20 enables the fishing assembly to be retained securely inside holes having irregular shapes. In the event the hole 12 is larger than the sleeve 15, a clearance space 30 defined therebetween acts as an insulation layer, to prevent or to delay further the hole 12 from freezing over.

A plurality of spaced apart lead spacers, such as the spacers 23, 26, 29 and 33 are connected generally equidistally to the flange 20, for holding it down against the upper surface of the ice under the force of gravity, to cause the assembly 10 to be retained securely inside the ice hole 12. The spacers 23, 26, 29 and 33 depend a short distance from the bottom surface of the flange 20, for supporting it at a short distance above the ice surface level 34, to define a clearance space 40 therebetween. Such clearance space 40 permits the user to slip his or her fingers therein to lift the assembly out of the hole 12.

A circular flat plastic cover 45 closes over the upper end 18 of the sleeve 15, and rests within a recess 47 inside the sleeve 15. For the purpose of supporting and retaining the cover 45, an annular ridge 50 depends radially inwardly from the inner surface of the sleeve 15 for defining an internal shoulder. Thus, with the cover 45 secured within the recess 47 of the sleeve 15, the accidental dislodgement thereof is prevented, since it is protected from the lateral wind forces. Furthermore, the cover 45 is disposed closer to the water surface level 48 for providing a better insulation thereto.

An opened slot 55 extends radially from about the center of the cover 45, to its outer periphery. Therefore, the user can insert the fishing line 57 through the slot 55, and move the line 57 toward the center of the cover 45. Thus, the cover 45 simultaneously protects the hole 12 from freezing over, and enables the user to enjoy an extended fishing activity without undue interruptions.

A generally upright plastic handle 67 extends integrally from the outer surface 70 of the cover 45 at a substantially right angle thereto, for providing a finger grip to the user, to enable him or her to carry the cover 45, to place it inside the sleeve 15 or to remove it therefrom. Therefore, the handle 67 facilitates the handling of the cover 45. Furthermore, the sleeve 15 and the cover 45 are composed of thermoplastic material, and are produced readily and inexpensively by conventional injection molding techniques. A flag assembly or an indicator mechanism 75 is mounted on the outer surface 70 of the cover 45, for retaining the fishing line 57, and for providing a ready visual indication whenever a fish (not shown) strikes the bait 76.

In use, the sleeve 15 is inserted inside the hole 12, and the flange 20 is allowed to rest on the surrounding ice surface 34. The fishing line 57 is inserted through the slot 55, and the cover 45 is then placed inside the sleeve 15 atop the ridge 50. The indicator mechanism 75 is maintained in a generally set horizontal position as indicated in broken lines in FIG. 2. The indicator mechanism provides an attention attracting signal to the user that a fish is nibbling at the bait by moving or oscillating between the set horizontal position and a strike upright position. When a fish strikes the bait 76, the indicator mechanism 75 is pivoted into such a generally upright visible strike position, to provide a visual indication to the user.

Considering now the sleeve 15 in greater detail with respect to FIGS. 1 through 4, it is generally composed of a suitable insulative material such as foamed polypropylene. The sleeve 15 can be produced by conventional injection molding techniques in a convenient, expeditious and relatively inexpensive manner. While the preferred thickness of the sleeve 15 is about ¼ inch, it will become apparent to those skilled in the art that different thicknesses may also be employed.

The sleeve 15 is elongated and hollow throughout its entire axial length, and it is generally cylindrical in shape, and circular in cross-section, for being positioned in ice holes, such as the hole 12. In this respect, it has been found that the preferred size of the outside diameter of the sleeve 15 ranges between 7 13/16 inches and 7 15/16 inches, and that the most preferred size is 7⅞ inches.

An internal annular ridge 50 depends integrally inwardly from the inner surface of the sleeve 15, for supporting and engaging the cover 45 in a recessed position inside the sleeve 15. In this regard, the inner ridge 50 is generally thin in order not to obstruct the internal opening 74 defined by the sleeve 15. Furthermore, the inner ridge 50 rigidifies the structure of the sleeve 15. While the preferred distance of the ridge 50 from the upper rim of the sleeve 15 is about 1 inch, it will become apparent to those skilled in the art that other distances can also be selected.

Thus, the assembly 10 in general, and the sleeve 15 in particular, can fit inside different ice holes, having standard sizes, such as 8, 9, 10 or 11 inches. Therefore, the assembly 10 is not only light in weight and compact in size, but it is also adaptable to fit universally inside a wide range of holes having different sizes and irregular shapes. Hence, the use of a single assembly, facilitates the transportation and storage of the fishing equipment, and renders the fishing expedition more enjoyable by offering the user a wider selection of fishing options.

Considering now the flange 20 in greater detail with particular reference to FIGS. 1 through 4, it extends integrally from the upper opened end 18 of the sleeve 15 for overlying the thereabout of the hole 12, to cover the clearance space 30 between the sleeve 15 and the inner surface of the ice hole 12, and to retain the assembly 10 securely inside the hole 12. The flange 20 has a generally flat construction and is annular in shape. The inner periphery of the flange 20 is commensurately sized relative to the upper rim 51 of the sleeve 15, and it is generally circular in shape. The outer periphery of the flange 21 is circular in shape and it is about 12 inches in diameter, in order to insure the secure engagement of the flange 20 with the larger 11 inch holes.

As better illustrated in FIGS. 1 and 4, the spacers 23, 26, 29 and 33 are generally equally spaced-apart along the surface of the flange 20, for providing a substantially balanced distribution of weight. In this regard, if the spacers 23, 26, 29 and 33 applied an unbalanced load on the flange 20, the latter would tend to become tilted at one side thereof, which may cause the dislodgment of the sleeve 15, and therefore of the assembly 10, from the hole 12.

The spacers 23, 26, 29 and 33 are generally similar in size and dimensions, and therefore only the spacer 23 will be described hereinafter in greater detail. The spacer 23 is generally arcuate and elongated, and it is disposed about halfway intermediate the inner and outer peripheries of the flange 20. Such arrangement of the spacers 23, 26, 29 and 33 provides an optimum weight distribution for retaining the flange 20 in overlying relationship with the thereabouts of the hole 12, without causing the apparatus 10 to become unduly heavy.

The flange 20 defines a particularly shaped keyway 92 for retaining the fishing line 57, during the fishing activity. The keyway 92 includes two elongated recesses 95 and 98 which extend inwardly from the outer periphery of the annular flange 20, and which are disposed intermediate two successive spacers 26 and 29. The recesses 95 and 98 are generally similar in shape and dimensions, with the exception that the recess 98, which includes an additional central opening 100 for enabling the user to secure the end of a drop line, such as the line 57, to the flange 20. Furthermore, the apparatus 10 can be used in conjunction with a fishing pole (not shown), whereby the line 57 is threaded through the keyway 92 and is extended to the fishing pole.

Considering now the cover 45 in greater detail with particular reference to FIGS. 1 and 4, it is generally circularly shaped, and it is complementary sized with respect to the inner diameter of the sleeve 15, in order to rest on the ridge 50 inside the sleeve 15. The cover 45 engages the inner surface of the sleeve 15 snugly, and further provides an air tight seal thereto. The cover 45 is preferably composed of injection molded foamed polypropylene. It has been found that the preferred thickness of the cover 45 ranges between ⅛ inches and 3/16 inches, and that the most preferred thickness is 0.150 inches.

For the purpose of enabling the fishing activities to be carried on, with the apparatus 10 in use, a narrow open slot 55 extends radially inwardly from the outer periphery of the cover 45 to its center, where it terminates in a central generally circularly shaped enlarged opening 63. Thus, the fishing line 57, is extended through the keyway 92, and into engagement with the indicator mechanism 75 as it will become clear in the following description. The line 57 is then passed through the slot 55 and the central opening 63, into the inner opening 74 defined by the sleeve 15.

While the slot 55 is adapted to receive the fishing line 57, it causes the cover 45 to be relatively weakened structurally. However, when the ridge 50 engages the cover 45, it not only retains the cover 45 inside the sleeve 15, but it further offsets the structural weakness introduced thereto by the slot 55. Therefore, the ridge 50 rigidifies the cover 45, and prevents undue flexing thereof. The slot 55 terminates at its opened end in a V-shape enlarged portion 103 to help guide the fishing line 57 into the slot 55. It has been found that the preferable width of the slot 55 is 1/16 inch, and the preferred diameter of the central opening 63 is ⅛ inch.

Considering now the handle 67 in greater detail with respect to FIGS. 1 through 3, it is generally a rectangular block fixed to the upper or outer surface of the cover 45, and includes a recess 105 for receiving the fingers of the user to facilitate the handling of the cover 45. A like recess (not shown) is disposed on the reverse side of the block.

Turning to the indicator mechanism 75, with reference to FIGS. 1 through 5, it generally includes a bent lever 110 which is pivotally secured to the outer surface 70 of the cover 45, and a portion of the fishing line 57 extending above the cover, for retaining a portion thereof in a substantially upright portion above the central opening 63 and the ice hole 12. The bent lever 110 terminates at one of its ends at 111 in a flag 113, for providing a ready visual indicator wherever a fish strikes the bait 76 at the submerged end of the fishing line 57. The bent lever 110 further includes a plurality of spaced-apart holes, such as the holes 115, 117 and 120, for receiving a plurality of counterweights, such as the weights 125, 127 and 129 respectively, at the flag side of the mechanism for counterbalancing the weight 131 which is attached to the submerged end of the fishing line 57.

The bent lever 110 is of a generally unitary L-shaped construction, and it is made of a pair of integrally connected flat plastic arms 133 and 135. The bent lever 110 is connected pivotally to the cover 45 by a pivot rod 137 interconnecting two spaced-apart substantially parallel upstanding pivot plates 140 and 142. The pivot rod 137 is disposed at a distance above the cover 45, sufficient to compensate for the recess 47, for retaining the long arm 135 in a generally horizontal position, as indicated in broken lines in FIG. 2, against the surrounding ice surface level 34.

The pivot rod 137 includes a central rod-like member 145 which terminates integrally into a pair of similar oppositely disposed short pins 147 and 149. The member 145 engages the rearward end 152 of the arm 135, at a generally right angle to its flat surface, and at about the bend 153 formed between the arms 133 and 135. The pins 147 and 149 engage the two pivot plates 140 and 142 for enabling the bent lever 110 to pivot freely about the pivot rod 137.

In this regard, the pivot plates 140 and 142 are generally rectangularly shaped and disposed in an upright position, substantially orthogonally to the outer surface 70 of the cover 45. The pivot plates 140 and 142 are similar to one another, and therefore only the pivot plate 140 will hereinafter be described in greater detail. The pivot plate 140 is generally composed of plastic, and is rigidified and maintained in its upright position by a generally triangularly shaped support 151. As best illustrated in FIG. 1, the support 151 has one of its sides secured to the pivot plate 140, and has its other side secured to the cover 45. Such sides of the support 151 form a right angle therebetween to retain the plate 140 in an upright generally vertical position.

The pivot plate 140 includes a hole 155 for receiving the pin 147 of the pivot rod 137. Similarly, the pivot plate includes a hole 156, which is generally similar to, and aligned with the hole 155, for receiving the opposite pin 149 of the pivot rod 137. Thus, the pivot rod 137 engages the pivot plates 140 and 142, and it is maintained in a generally horizontal position, at a distance above the cover 45. The holes 155 and 156 are sufficiently distanced from the cover 45, to enable the arm 135 of the lever 110 to be pivoted from a horizontal at rest position, to an upright position.

Considering now the arm 135 of the lever 110 with respect to FIGS. 1-3 and 5, it is generally flat and elongated and it is connected at its forwardmost end 111 to the flag 113. The arm 135 includes a plurality of relatively small spaced-apart holes such as the holes 115, 117 and 120, for receiving the counterweights 125, 127 and 129. A hole 157 is defined at the rearwardmost end 152 of the arm 135 for receiving the pivot rod 137.

The indicator mechanism 75 is assembled and disassembled readily, by simply flexing the pivot plates 140 and 142 outwardly to cause them to spread apart slightly. The pivot rod 137 is inserted in the hole 157, and the pins 147 and 149 are inserted into the respective holes 155 and 156 in the pivot plates 140 and 142. Finally, the plates 140 and 142 are returned to their unstressed condition, for engaging pivotally the pivot rod 137 and the bent lever 110.

The arm 133 is substantially shorter than the arm 135, and it is flat in construction. The arm 133 defines a notch 165 at its rear end 163, for retaining a portion of the line 57 in a generally upright position above the central opening 63 in the cover 45. The arm 133 terminates in a flat end portion 159 which engages the outer surface 70 of the cover 45, when the arm 135 is caused to be pivoted into an upright substantially vertical position. Thus, when the lever 110 is in a set horizontal position, or in a nibbling position, intermediate the set and the upright strike positions, the notch 165 prints upwardly, and the line 57 is retained securely by the short arm 133, inside the notch 165. On the other hand, when the lever 110 is in the strike upright position, the flat end portion 159 engages the cover 45, and causes the notch 165 to point downwardly and the line to be disengaged therefrom.

In order to further retain and lock the lever 110 securely in an upright position, an ear 160 extends integrally from the bend 153, and engages an elongated strike rod 163, for use as a detent device. The ear 160 is generally triangularly shaped and has one side 173 extending integrally from the arm 135 to define a smooth arcuate position 181 therewith. The ear 160 has another side 175 which extends integrally angularly from the arm 133, for defining an acute angle 185 therewith, in order to enable the strike rod 163 to engage the bend 164 formed thereby, for locking the lever 110 in an upright position.

As shown in FIG. 4, the strike rod 163 engages the pivot plate 142 at one end thereof, and has its other end 164 engage the opposite pivot plate 140. Thus, when the lever 110 is pivoted from the set horizontal position to the strike position, the strike rod 163 engages the arcuate portion 181 of the ear 160, and rides smoothly therealong past the tip 173 and into the bend 164, where it is retained securely in position, for maintaining the arm 135 in an upright position.

While a particular embodiment of the present invention has been disclosed, it is to be understood that various different modifications are possible and are contemplated within the true spirit and scope of the appended claims. There is no intention, therefore, of limitations to the exact abstract or disclosure herein presented.

What is claimed is:

1. A fishing assembly adapted to prevent an ice hole from freezing, comprising:
   a tubular hollow elongated sleeve for fitting inside the ice hole;
   a flange means secured to said sleeve for retaining it securely in position inside the ice hole;
   cover means secured removably to the upper end of said sleeve for closing it over;
   said cover means defining an entranceway to the ice hole; and
   means for supporting said cover means entirely within the hollow interior of said sleeve at a substantial distance from the upper edge thereof, thereby tending to prevent inadvertent dislodgement thereof.

2. A fishing assembly according to claim 1, wherein said flange means includes a flat annular rim, for overlying the ice surrounding the hole.

3. A fishing assembly according to claim 2, wherein said rim depends integrally from said sleeve.

4. A fishing assembly according to claim 2, wherein said rim defines a keyway for receiving a fishing line, and for causing it to be retained securely by said rim.

5. A fishing assembly according to claim 2, further including a plurality of spaced-apart spacers, that are connected to said rim, for acting as a counterweights, and to cause the fishing assembly to be retained securely inside the hole.

6. A fishing assembly according to claim 5, wherein said spacers extend a short distance below the bottom surface of said rim, for supporting it at a distance from the ice level, and to define a clearance space therebetween.

7. A fishing assembly according to claim 1, wherein said means for supporting said cover means includes an annular ridge connected internally to said sleeve, for retaining said cover means therein.

8. A fishing assembly according to claim 7, wherein said ridge includes an internal annular shoulder that extends integrally inwardly from said sleeve.

9. A fishing assembly according to claim 8, wherein said shoulder is disposed at a distance from the upper end of said sleeve for defining a recess therebetween.

10. A fishing assembly according to claim 1, wherein said sleeve is made of thermoplastic material.

11. A fishing assembly according to claim 1, wherein said sleeve is circular in cross-section.

12. A fishing assembly according to claim 1, wherein said entranceway includes an elongated slit-like slot for receiving a part of the fishing line.

13. A fishing assembly according to claim 12, wherein said entranceway extends radially from an opened end at the outer periphery of said cover means to a closed end at about the center of said cover means.

14. A fishing assembly according to claim 13, wherein said entranceway terminates in a substantially round opening at said closed end.

15. A fishing assembly according to claim 12, wherein said cover means includes an outer surface, and a handle secured to said outer surface.

16. A fishing assembly according to claim 1, further including indicator means secured to the outer surface of said cover means, for providing a visual indication of the status of the fishing activities.

17. A fishing assembly according to claim 16, wherein said indicator means includes a flag mechanism.

18. A fishing assembly according to claim 17, wherein said flag mechanism includes a flag, and lever means secured to said flag, for causing said flag to pivot from a generally horizontal position when at rest, to a generally upright position for giving the visual inspection.

19. A fishing assembly according to claim 18, wherein said lever means includes two arms that are angularly disposed relative to one another.

20. A fishing assembly according to claim 19, wherein one of said arms defines a plurality of spaced-apart, relatively small holes for receiving selective one or more counterweights.

* * * * *